United States Patent
Ida

(10) Patent No.: US 8,959,543 B2
(45) Date of Patent: Feb. 17, 2015

(54) DEVICE CONTROL APPARATUS AND DEVICE CONTROL METHOD

(71) Applicant: Kabushiki Kaisha Toshiba, Tokyo (JP)

(72) Inventor: Tomotaka Ida, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/172,740

(22) Filed: Feb. 4, 2014

(65) Prior Publication Data

US 2014/0157332 A1 Jun. 5, 2014

Related U.S. Application Data

(63) Continuation of application No. 13/413,502, filed on Mar. 6, 2012, now abandoned.

(30) Foreign Application Priority Data

Jun. 24, 2011 (JP) .................................. 2011-141096

(51) Int. Cl.
| | |
|---|---|
| *H04N 7/16* | (2011.01) |
| *H04N 21/436* | (2011.01) |
| *H04N 21/442* | (2011.01) |
| *H04N 21/45* | (2011.01) |
| *H04N 21/478* | (2011.01) |
| *H04N 21/485* | (2011.01) |
| *H04N 21/488* | (2011.01) |
| *H04L 12/28* | (2006.01) |
| *H04Q 5/22* | (2006.01) |
| *G06F 17/00* | (2006.01) |

(52) U.S. Cl.
CPC ... *H04N 21/43615* (2013.01); *H04N 21/44222* (2013.01); *H04N 21/44231* (2013.01); *H04N 21/4532* (2013.01); *H04N 21/478* (2013.01); *H04N 21/4781* (2013.01); *H04N 21/485* (2013.01); *H04N 21/4882* (2013.01); *H04L 12/2821* (2013.01); *H04L 2012/2849* (2013.01)
USPC .................. 725/29; 340/10.1; 725/26; 463/29

(58) Field of Classification Search
USPC .......................... 340/10.1; 725/29, 26; 463/29
See application file for complete search history.

(56) References Cited

U.S. PATENT DOCUMENTS

| | | | | |
|---|---|---|---|---|
| 5,929,941 | A * | 7/1999 | Tsuchiya et al. | 348/706 |
| 2005/0183113 | A1* | 8/2005 | Ozaki | 725/29 |
| 2012/0291060 | A1* | 11/2012 | Relyea et al. | 725/25 |

* cited by examiner

*Primary Examiner* — Jennifer Mehmood
*Assistant Examiner* — Omar Casillashernandez
(74) *Attorney, Agent, or Firm* — Blakely, Sokoloff, Taylor & Zafman LLP

(57) ABSTRACT

According to one embodiment, a first displaying device comprises an acquisition module, a display controller and a game time controller. The acquisition module is configured to obtain information related to a first terminal from a second displaying device. The first terminal of the second displaying device is coupled to a game device while a second terminal of the second displaying device is coupled to a network. The display controller is configured to display the information to indicate whether the first terminal is being coupled to the game device or not. The game time controller is configured to measure a time for which the first terminal is coupled to the game device, based on the information obtained by the acquisition module, and to prompt the second displaying device to exclude the connection between the first terminal and the game device, when the measured time reaches a predetermined time set in advance.

8 Claims, 10 Drawing Sheets

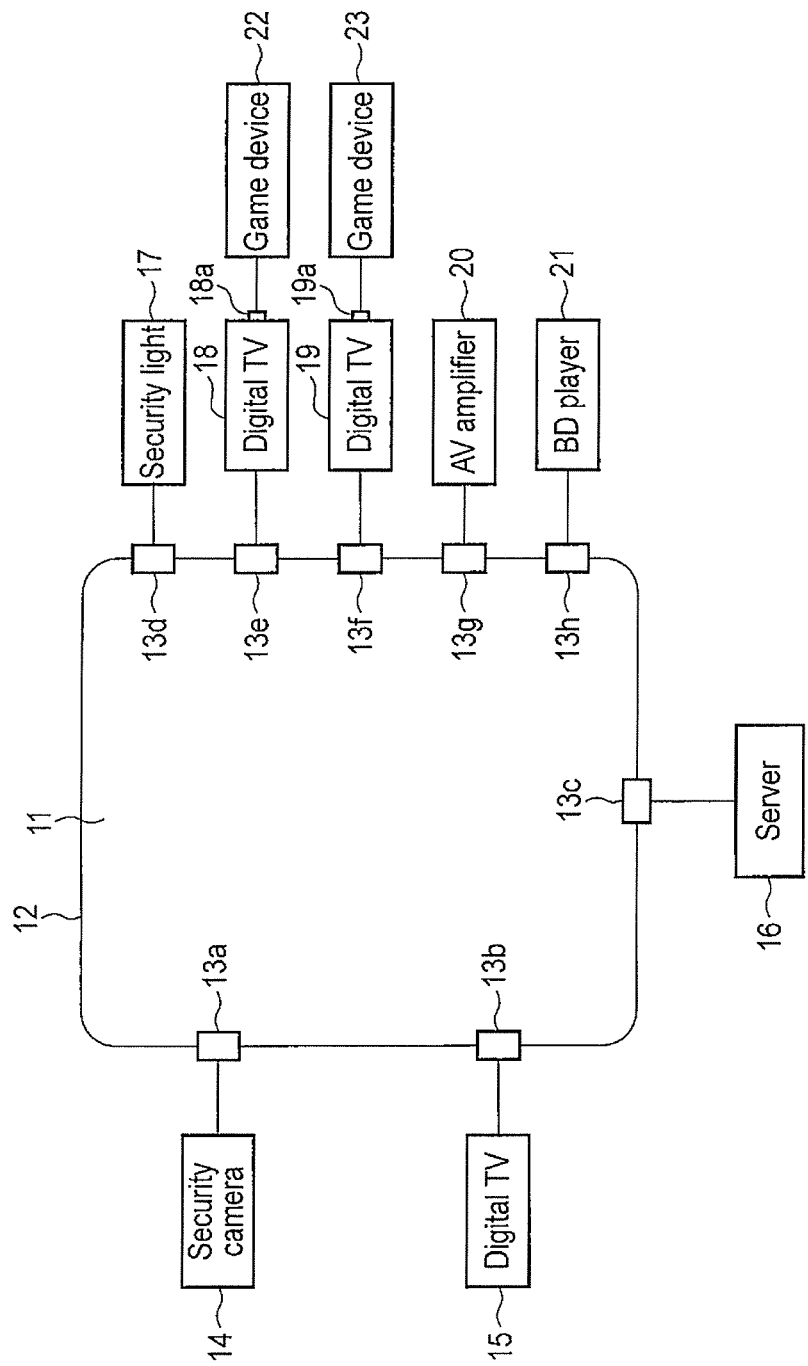
F I G. 1

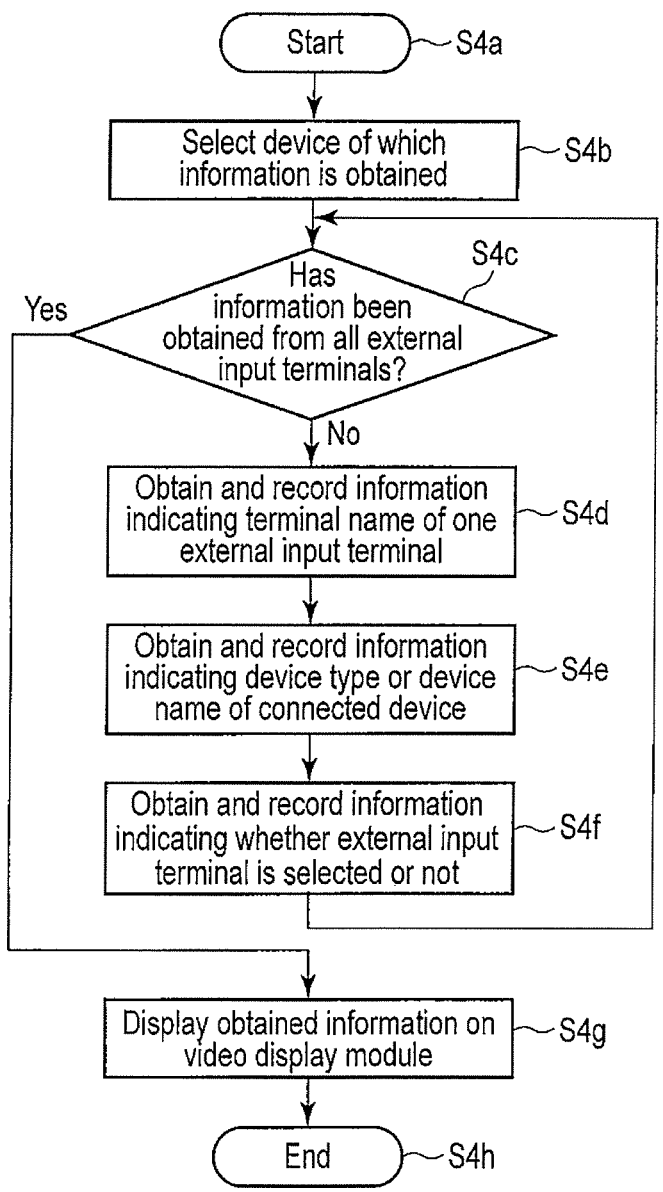
F I G. 4

46

| Select device |
| --- |
| △ |
| Digital television broadcast reception apparatus 18 |
| Digital television broadcast reception apparatus 19 |
| AV amplifier |
| ▽ |
| Make selection with cursor-moving keys, enter with enter key, and return to previous screen with backward key |

F I G. 5

47

| Display input situation list | |
|---|---|
| Video 1 | none |
| Video 2 | DVD recorder |
| HD1 | Game device |

Make selection with cursor-moving keys, enter with enter key, and return to previous screen with backward key

F I G. 6

48

Display details

HD1

| Connected device | Game |
|---|---|
| Input state | Selected |
| Selected time | 00:35 |
| Game timer setting | ON |
| Timer | 60 minutes |

F I G. 7

DEVICE CONTROL APPARATUS AND DEVICE CONTROL METHOD

CROSS-REFERENCE TO RELATED APPLICATIONS

This application a Continuation application that is based upon and claims the benefit of priority from U.S. application Ser. No. 13/413,502, now abandoned, which is based upon and claims the benefit of priority from prior Japanese Patent Application No. 2011-141096, filed Jun. 24, 2011, the entire contents of which are incorporated herein by reference.

FIELD

Embodiments described herein relate generally to a device control apparatus and a device control method for controlling various kinds of home electronic devices on a home network, for example.

BACKGROUND

As is commonly known, in recent years, various kinds of home electronic devices such as a personal computer (PC), a television broadcast reception apparatus, and a recording/reproduction apparatus have a network connection function, so that a home network can be established using the network connection function.

In the home network, each connected device can control another. For example, based on control of a PC, a television broadcast reception apparatus can be caused to receive a desired program and record the program content to a recording/reproduction device, or the television broadcast reception apparatus can be caused to read desired content from the recording/reproduction device and reproduce the content.

Incidentally, this kind of home network is still under development, and there is much room for improvement. More specifically, it can be said that, for example, the home network has not yet developed to a level where a host device controls another device to perform a sufficiently practical control process desired by the user.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block configuration diagram for schematically explaining an example of a home network according to an embodiment;

FIG. 4 is a flowchart illustrating and explaining an example of processing operation performed by the digital television broadcast reception apparatus according to the embodiment;

FIG. 5 is a figure illustrating and explaining an example of a device selection-screen displayed by the digital television broadcast reception apparatus according to the embodiment;

FIG. 6 is a figure illustrating and explaining an example of an input situation list display screen displayed by the digital television broadcast reception apparatus according to the embodiment;

FIG. 7 is a figure illustrating and explaining an example of a detailed display screen displayed by the digital television broadcast reception apparatus according to the embodiment;

DETAILED DESCRIPTION

Figure 2:
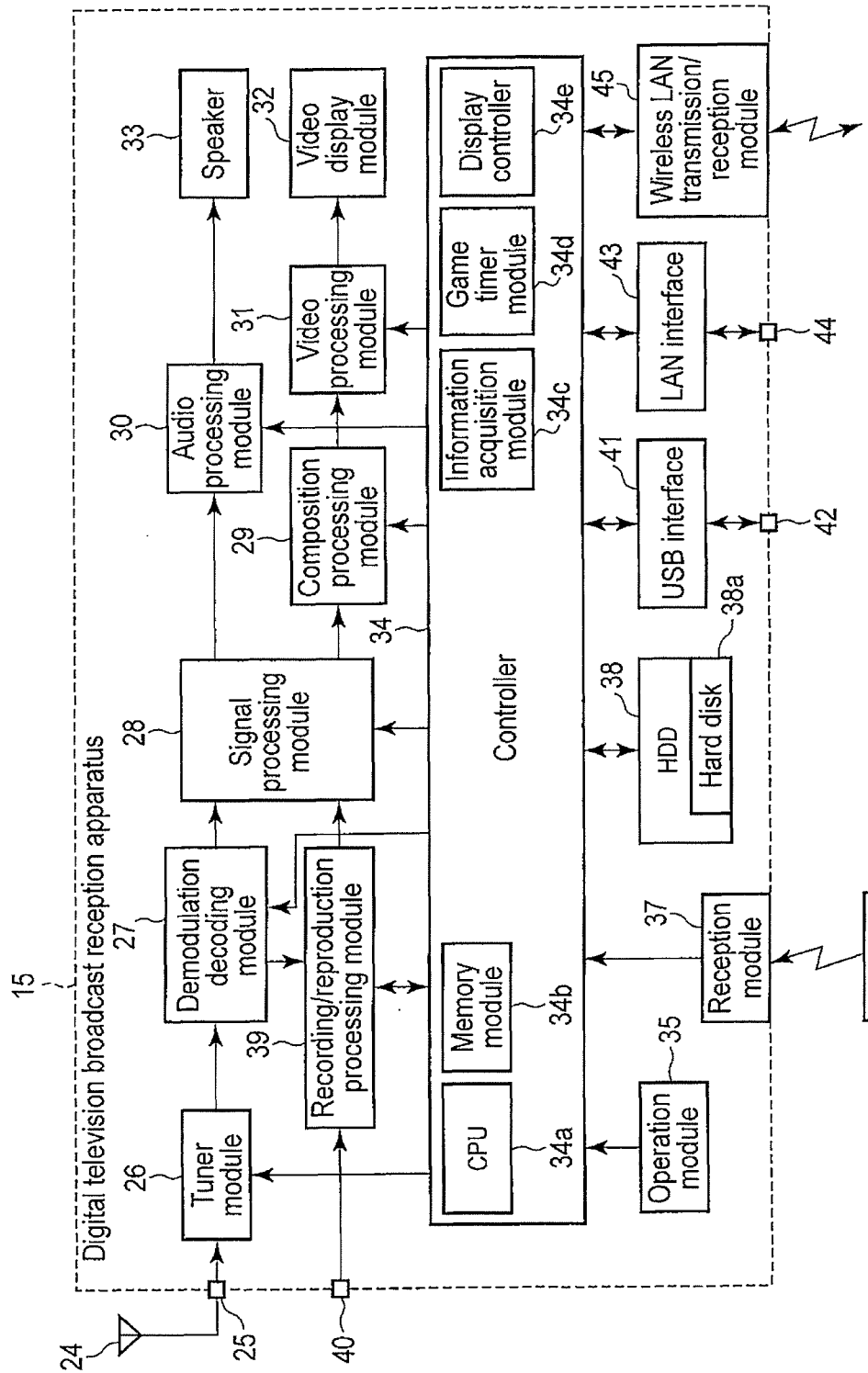
FIG. 2 is a block configuration diagram illustrating and explaining an example of a signal processing system of a digital television broadcast reception apparatus serving as a host device on the home network according to the embodiment.

Various embodiments will be described hereinafter with reference to the accompanying drawings.

In general, according to one embodiment, a device control apparatus comprises an acquisition module and a display controller. The acquisition module is configured to obtain information about an external input terminal of a device connected to a network from the device. The display controller is configured to display the information obtained by the acquisition module in such a manner that the information corresponds to the external input terminal.

FIG. 1 illustrates an overview of a home network 11 explained in this embodiment. For example, the home network 11 is established using so-called power line communications (PLC) technology for connecting various kinds of home electronic devices using an electric power line 12 as a communication line in a detached house.

That is, for example, in the home network 11, electronic devices such as a security camera 14, a digital television broadcast reception apparatus 15, a server 16, a security light 17, digital television broadcast reception apparatuses 18, 19, an AV (audio visual) amplifier 20, and a BD (blu-ray disk) player 21 are connected to the electric power line 12 via PLC adapters 13a to 13h.

Among them, the server 16 is adapted to store information about specifications and setting conditions set in advance concerning each of various kinds of electronic devices 14 to 21 constituting the home network 11, and record various kinds of information changing over time such as operation state and control state.

Further, various kinds of electronic devices 14 to 21 constituting the home network 11 are controlled so as to be able to communicate with each other based on management of the PLC adapters 13a to 13h. As a result, the electronic devices 14 to 21 can perform state management and device control by communicating with each other.

That is, various kinds of electronic devices 14 to 21 connected to the PLC adapters 13a to 13h reside within the range directly managed by the PLC adapters 13a to 13h. Therefore, for example, when the digital television broadcast reception apparatus 15 is a host device, the digital television broadcast reception apparatus 15 communicates with other electronic devices such as digital television broadcast reception apparatuses 18, 19 to control the other electronic devices.

On the other hand, the digital television broadcast reception apparatuses 18, 19 include a plurality of (only one is shown in FIG. 1) external input terminals 18a, 19a. For example, when game devices 22, 23 are connected to the external input terminals 18a, 19a, the game devices 22, 23 reside outside of the range directly managed by the PLC adapters 13a to 13h.

Therefore, even though the digital television broadcast reception apparatus 15 serving as the host device communicates with the digital television broadcast reception apparatuses 18, 19, the digital television broadcast reception apparatus 15 cannot recognize that the game devices 22, 23 are connected. This means that the digital television broadcast reception apparatus 15 cannot control the digital television broadcast reception apparatuses 18, 19 with regard to the game devices 22, 23. In other words, this has not yet developed to a level where the devices perform a sufficiently practical control process desired by the user.

As regards this issue, this embodiment is configured to allow the digital television broadcast reception apparatus 15 serving as the host device to obtain, with regard to the digital television broadcast reception apparatuses 18, 19, i.e., the other electronic devices, information about the situation of the external input terminals 18a, 19a such as information indicating what kind of devices are connected to which external input terminal and information indicating which external input terminal is selected.

As a result, the digital television broadcast reception apparatus 15 serving as the host device can control the digital television broadcast reception apparatuses 18, 19, i.e., the other devices, with regard to the game devices 22, 23, thus performing a sufficiently practical control process desired by the user.

FIG. 2 schematically illustrates a signal processing system of the digital television broadcast reception apparatus 15 serving as the host device. In other words, a digital television broadcast signal received by an antenna 24 is provided to a tuner module 26 via an input terminal 25, so that a broadcast signal of a desired channel is selected.

The broadcast signal selected by the tuner module 26 is provided to the demodulation decoding module 27 and restored back to a digital video signal and a digital audio signal, which are thereafter output to a signal processing module 28. The signal processing module 28 performs predetermined digital signal processing on each of the digital video signal and the digital audio signal provided from the demodulation decoding module 27.

Then, the signal processing module 28 outputs the digital video signal to a composition processing module 29, and outputs the digital audio signal to the audio processing module 30. Among them, the composition processing module 29 overlays an on-screen display (OSD) signal onto the digital video signal supplied from the signal processing module 28, and outputs the digital video signal to a video processing module 31.

The video processing module 31 converts the input digital video signal into an analog video signal in a format that can be displayed by a video display module 32 provided downstream. Then, the analog video signal that is output from the video processing module 31 is provided to the video display module 32, so that it is displayed as video.

Further, the audio processing module 30 converts the input digital audio signal into an analog audio signal in a format that can be reproduced by a speaker provided downstream. Then, the analog audio signal that is output from the audio processing module 30 is provided to the speaker 33, so that it is reproduced as audio.

At this occasion, all the operations including various kinds of reception operations explained above in the digital television broadcast reception apparatus 15 are centrally controlled by a controller 34. The controller 34 has a central processing module (CPU) 34a therein, and receives operation information from an operation module 35 provided on the main body of the digital television broadcast reception apparatus 15 or receives operation information transmitted by a remote controller 36 and received by the reception module 37, thus controlling each module so as to reflect the content of operation.

In this case, the controller 34 uses a memory module 34b. The memory module 34b mainly includes a read only memory (ROM) storing a control program executed by a CPU 34a, a random access memory (RAM) providing a work area for the CPU 34a, and a nonvolatile memory storing various kinds of setting information and control information.

The controller 34 is connected to a hard disk drive (HDD) 38. The controller 34 can control a recording/reproduction processing module 39 to encrypt the digital video signal and the digital audio signal obtained by the demodulation decoding module 27 and convert the digital video signal and the digital audio signal into a predetermined recording format, based on operation performed by the user with the operation module 35 and the remote controller 36, and provide the digital video signal and the digital audio signal to the HDD 38, so that the digital video signal and the digital audio signal are recorded to the hard disk 38a.

Further, the controller 34 can control the HDD 38 to read the digital video signal and the digital audio signal from the hard disk 38a, based on operation performed by the user with the operation module 35 and the remote controller 36, cause the recording/reproduction processing module 39 to encrypt the digital video signal and the digital audio signal, and thereafter provide the digital video signal and the digital audio signal to the signal processing module 28, so that the digital video signal and the digital audio signal are thereafter provided to be displayed as video and reproduced as audio, as explained above.

Further, the recording/reproduction processing module 39 is connected to the input terminal 40. The input terminal 40 is provided to directly input the digital video signal and the digital audio signal from the outside of the digital television broadcast reception apparatus 15. Based on control of the controller 34, the digital video signal and the digital audio signal which are input via the input terminal 40 are provided to the signal processing module 28 by way of the recording/reproduction processing module 39, so that the digital video signal and the digital audio signal are thereafter provided to be displayed as video and reproduced as audio, as explained above.

Further, based on control of the controller 34, the digital video signal and the digital audio signal which are input via the input terminal 40 are provided by way of the recording/reproduction processing module 39 to the HDD 38, so that the digital video signal and the digital audio signal are provided for recording/reproduction in the hard disk 38a by the HDD 38.

In addition, the controller 34 is connected to a USB terminal 42 via a universal serial bus (USB) interface 41. This allows the controller 34 to communicate with a USB device, not shown, connected to the USB terminal 42 via the USB interface 41. It should be noted that the digital television broadcast reception apparatus 15 is connected to the PLC adapter 13b via the USB terminal 42, and communicates according to the USB standard.

Further, the controller 34 is connected to a LAN terminal 44 via a local area network (LAN) interface 43. This allows the controller 34 to communicate via the LAN interface 43 with a device, not shown, connected to the LAN terminal 44.

In addition, the controller 34 is connected to a wireless LAN transmission/reception module 45. This allows the controller 34 to wirelessly communicate with a device, not shown, having a wireless LAN transmission/reception function via the wireless LAN transmission/reception module 45.

In addition, the controller 34 is provided with an information acquisition module 34c, a game timer module 34d, and a display controller 34e. Among them, the information acquisition module 34c has a function of obtaining information about the situations of the external input terminals 18a, 19a from the other electronic devices on the home network 11 such as the digital television broadcast reception apparatuses 18, 19.

Examples of the information include a terminal name of an external input terminal, information indicating which external input terminal a device is connected to, information indicating the type of a connected device, and information indicating which external input terminal is selected. The information can be obtained as follows. Although communication means for constituting the home network 11 is not limited, a command is defined on a communication protocol used in the home network 11, and the digital television broadcast reception apparatus 15 serving as the host device perform inter-device communication with the other digital television broadcast reception apparatuses 18, 19, thus obtaining the information.

For example, when the home network 11 has a LAN connection environment using Ethernet (registered trademark), a command is defined to perform detailed inter-device communication between the host device and another device on transmission control protocol (TCP)/internet protocol (IP), so that the host device can obtain information about the situation of the external input terminal of the another device.

In other words, the TCP/IP defines a very basic portion of a communication standard, and does not define a command for obtaining the information about the situation of the external input terminal of the device on the home network 11 from the device as explained above. Therefore, it is necessary to define the command therefor in order to obtain the information about the situation of the external input terminal of the device on the home network 11 from the device.

In this case, for example, various kinds of operation forms can be considered, e.g., operation for starting a process for obtaining information when a screen is requested to be displayed, or an operation for causing a device on the home network 11 to report, in one way, information about the situation of the external input terminal. Therefore, it is necessary to define the commands in accordance with, e.g., the specifications of the devices capable of establishing the home network 11 so as to achieve a required form of operation.

The game timer module 34d is used to achieve a so-called game timer function, with which the digital television broadcast reception apparatus 15 serving as the host device imposes limitations on limits of the allowable time of use of the game devices 22, 23 externally connected to the other digital television broadcast reception apparatuses 18, 19 on the home network 11.

Further, the display controller 34e has a function of displaying, e.g., various kinds of information obtained by the information acquisition module 34c, a time measured by the game timer module 34d, and other necessary information, on the video display module 32 and the other digital television broadcast reception apparatuses 18, 19 on the home network 11.

Figure 3:
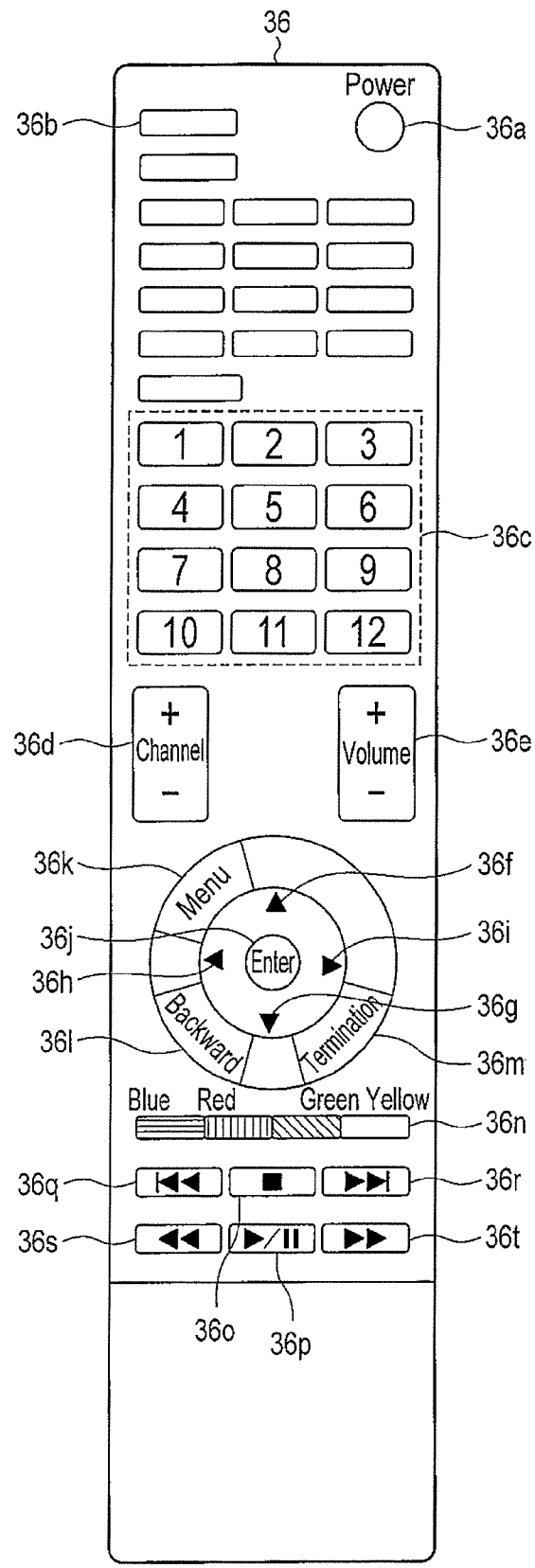
FIG. 3 is an external view illustrating and explaining an example of a remote controller used in the digital television broadcast reception apparatus according to the embodiment.

FIG. 3 illustrates an external appearance of the remote controller 36. The remote controller 36 is mainly provided with a power key 36a, a game timer key 36b, a numeric key 36c, a channel up/down key 36d, a volume adjustment key 36e, a cursor upward moving key 36f, a cursor downward moving key 36g, a cursor left moving key 36h, a cursor right moving key 36i, an enter key 36j, a menu key 36k, a backward key 36l, a termination key 36m, four (blue, red, green, yellow) color keys 36n, and the like.

The remote controller 36 is provided with a reproduction stop key 36o, a reproduction/pause key 36p, a backward skip key 36q, a forward skip key 36r, a fast-backward key 36s, a fast-forward key 36t, and the like.

In other words, by manipulating the reproduction stop key 36o and the reproduction/pause key 36p of the remote controller 36, the HDD 38 can perform reproduction, stop, and pause.

By manipulating the backward skip key 36q and the forward skip key 36r of the remote controller 36, data of video, audio, and the like read from the hard disk 38a by the HDD 38 can be reproduced with so-called backward skip and forward skip, i.e., the data of video, audio, and the like are skipped in the backward direction or the forward direction with respect to the reproduction direction by a certain amount.

Further, by manipulating the fast-backward key 36s and the fast-forward key 36t of the remote controller 36, data of video, audio, and the like read from the hard disk 38a by the HDD 38 can be reproduced with so-called fast-backward reproduction and fast-forward reproduction, i.e., the data of video, audio, and the like are continuously reproduced at a fast speed in the backward direction or the forward direction with respect to the reproduction direction.

FIG. 4 illustrates a flowchart summarizing processing operation in which the digital television broadcast reception apparatus 15 serving as the host device obtains information about the situation of the external input terminal of the predetermined digital television broadcast reception apparatus 1 on the home network 11 from the digital television broadcast reception apparatus 18. It should be noted that processing operation for obtaining information about the situation of the external input terminals of the electronic devices 19 to 21 from the electronic devices 19 to 21 can be explained in the same manner.

In other words, when the processing starts (step S4a), an electronic device for obtaining information about the situation of the external input terminal (in this case, the digital television broadcast reception apparatus 18) is selected in step S4b. The selection is made as follows. The user manipulates the menu key 36k of the remote controller 36 to follow a plurality of menu screens arranged in a hierarchical structure, and thereby a device selection-screen 46 as shown in FIG. 5 is displayed on the video display module 32.

The device selection-screen 46 is scrolled when the user manipulates the cursor upward or downward moving keys 36f, 36g of the remote controller 36, so that all the electronic devices connected to the home network 11 are displayed except the digital television broadcast reception apparatus 15 serving as the host device.

Then, on the device selection-screen 46, the user manipulates the cursor upward or downward moving keys 36f, 36g of the remote controller 36 to select a desired electronic device, and manipulates the enter key 36j, thereby selecting and setting the device.

Then, the information acquisition module 34c of the digital television broadcast reception apparatus 15 serving as the host device determines whether information about the situation of all the external input terminals of the selected device (in this case, the digital television broadcast reception apparatus 18) is obtained or not in step S4c.

When the information is determined not to be obtained (NO), the information acquisition module 34c obtains and records information indicating the terminal name of an external input terminal in step S4d. Thereafter, the information acquisition module 34c obtains and records information indicating the type or the device name of a device connected to the external input terminal of which the information about the terminal name is obtained in step S4e. When no device is connected, information indicating such is obtained and recorded. Subsequently, the information acquisition module 34c obtains and records information indicating whether the external input terminal is currently selected or not in step S4f, and thereafter returns back to the processing in step S4c.

On the other hand, when the information about the situation of all the external input terminals is determined to have been obtained in step S4c (YES), the display controller 34e displays various kinds of information obtained and recorded by the information acquisition module 34c on the video display module 32 in step S4g, and terminates the processing (step S4h).

FIG. 6 illustrates an example of an input situation list display screen 47 in which the information about the situation of all the external input terminals of the digital television broadcast reception apparatus 18 is displayed on the video display module 32 as described above. The input situation list display screen 47 is scrolled when the user manipulates the cursor upward or downward moving keys 36f, 36g of the remote controller 36, so that the situation of all the external input terminals of the digital television broadcast reception apparatus 18 are displayed.

In the example as shown in FIG. 6, in the digital television broadcast reception apparatus 18, no device is connected to the external input terminal having a terminal name "video 1", a DVD recorder is connected to the external input terminal having a terminal name "video 2", and the game device 22 is connected to the external input terminal (18a) of a terminal name "HD1".

In this case, when the user manipulates the cursor upward or downward moving keys 36f, 36g of the user remote controller 36 to select a desired terminal name HD1 and manipulates the enter key 36j, a detailed display screen 48 illustrating the external input terminal 18a as shown in FIG. 7 in more detail is displayed on the video display module 32.

With regard to the external input terminal (18a) of the terminal name HD1, the detailed display screen 48 as shown in FIG. 7 indicates that the connected device is a game device, the input state is "selected", the selected time is 35 minutes, the game timer setting is "ON", and the timer is set to 60 minutes.

According to the embodiment, the digital television broadcast reception apparatus 15 serving as the host device can obtain information about the situation of the external input terminal of the digital television broadcast reception apparatus 18 serving as the other electronic device on the home network 11.

Therefore, the digital television broadcast reception apparatus 15 serving as the host device can control the digital television broadcast reception apparatus 18 serving as the other device with regard to the device connected to the external input terminal, thus performing a sufficiently practical control process for the user.

It should be noted that the time when the information acquisition module 34c obtains the information about the situation of the external input terminals of the devices other than the host device is not limited to the time when the device is selected and set as explained above. For example, the information acquisition module 34c may obtain the information at a regular interval or in a time zone in which the communication load of the home network 11 is low.

It should be noted that the time when the display controller 34e displays information obtained by the information acquisition module 34c on the video display module 32 is not limited to the time when the information about the situation of the external input terminals of the selected device is obtained as explained above. For example, the display controller 34e may display the information while the user performs an operation for requesting display.

Subsequently, a specific example in which the host device controls a device connected to an external input terminal of another device will be explained.

Figure 8:
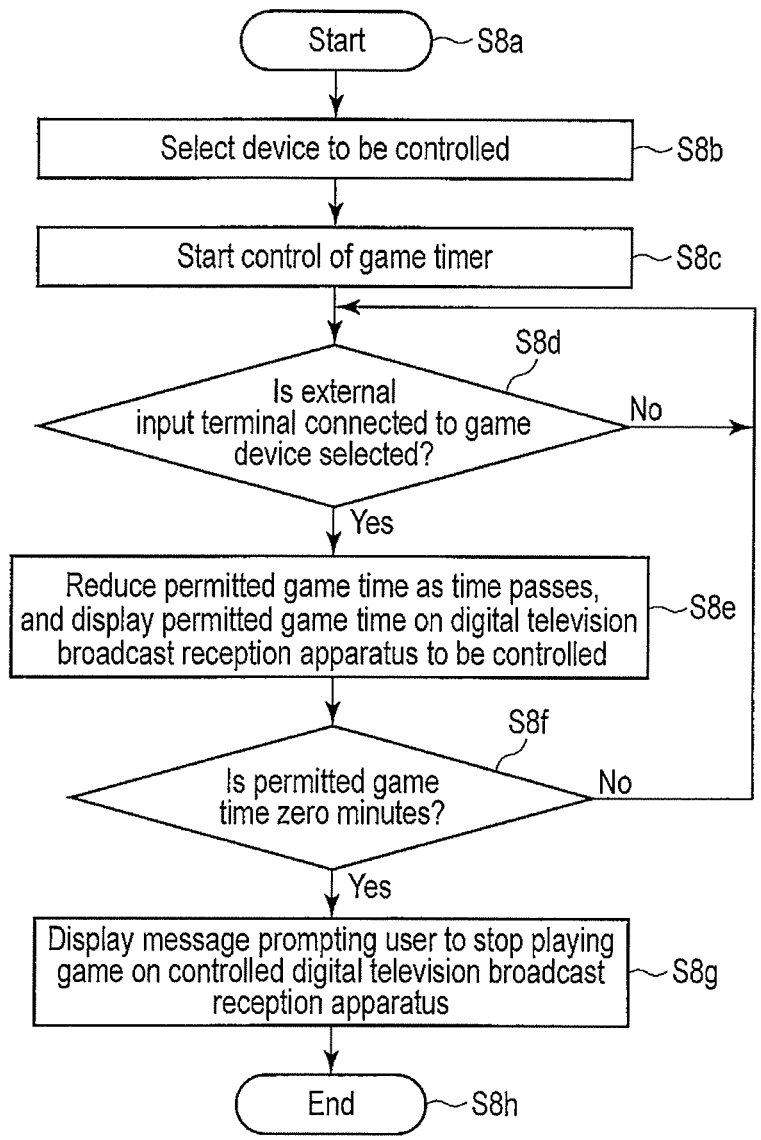
FIG. 8 is a flowchart illustrating and explaining another example of processing operation performed by the digital television broadcast reception apparatus according to the embodiment.

FIG. 8 illustrates a flowchart summarizing processing operation in which the digital television broadcast reception apparatus 15 serving as the host device controls the game timer of the game device 22 connected to the external input terminal 18a of the predetermined digital television broadcast reception apparatus 18 on the home network 11.

In other words, when processing starts (step S8a), an electronic device to be controlled (in this case, digital television broadcast reception apparatus 18) is selected in step S8b. The selection is made by displaying the device selection-screen 46 as shown in FIG. 5 on the video display module 32 as explained above.

Then, the game timer module 34d of the digital television broadcast reception apparatus 15 serving as the host device starts control of the game timer in step S8c. The start of control of the game timer is requested when the user manipulates the game timer key 36b of the remote controller 36.

Then, the game timer module 34d determines whether the digital television broadcast reception apparatus 18 selects the external input terminal 18a connected to the game device 22 or not in step S8d. Then, when the external input terminal 18a connected to the game device 22 is determined to be selected (YES), the game timer module 34d reduces a permitted game time set in advance (for example, initial value of 60 minutes and the like) every time a predetermined time passes in step S8e.

Figure 9:
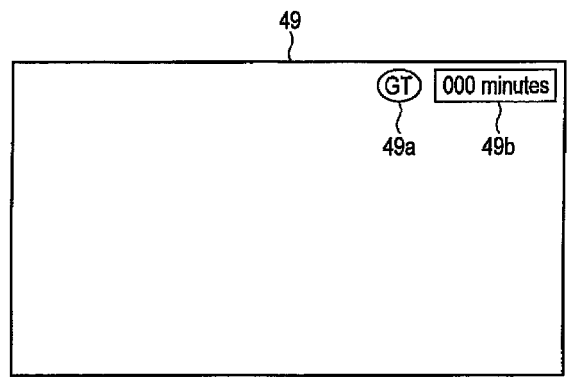
FIG. 9 is a figure illustrating and explaining an example of a display screen displayed by the digital television broadcast reception apparatus according to the embodiment.

In this case, the permitted game time reduced by the game timer module 34d is displayed on the screen of the controlled digital television broadcast reception apparatus 18 by the display controller 34e. FIG. 9 illustrates a display screen 49 of the controlled digital television broadcast reception apparatus 18 at this occasion. At the upper right portion of the screen of the screen, the display screen 49 displays an icon 49a indicating that the game timer function is activated and an icon 49b indicating the permitted game time.

Thereafter, in step S8f, the game timer module 34d determines whether the permitted game time attains 0 minutes or not, and when the game timer module 34d determines that the permitted game time has not yet attained 0 minutes (NO), the game timer module 34d returns to the processing of step S8d. When the game timer module 34d determines that the permitted game time has attained 0 minutes in step S8f (YES), the game timer module 34d displays a message prompting a user to stop playing the game on the screen of the controlled digital television broadcast reception apparatus 18 with the display controller 34e in step S8g, and terminates the processing (step S8h).

Figure 10:
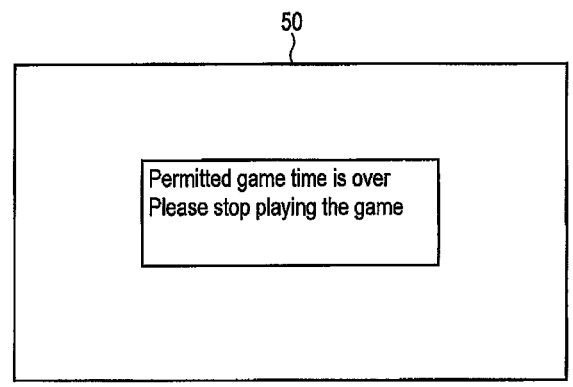
FIG. 10 is a figure illustrating and explaining an example of a display screen displayed by the digital television broadcast reception apparatus according to the embodiment.

FIG. 10 illustrates a display screen 50 of the controlled digital television broadcast reception apparatus 18 at this occasion. At the central portion of the screen of the display screen 50, the following message is displayed: "Permitted game time is over. Please stop playing the game."

According to the game timer control explained above, without using the digital television broadcast reception apparatus 18 connected to the game device 22, the digital television broadcast reception apparatus 15 serving as the host device can cause the game device 22 connected to the external input terminal 18a of the other digital television broadcast reception apparatus 18 to activate the function of the game timer control. Therefore, a sufficiently practical control process for the user can be achieved. For example, the parent can limit the children's game time without entering a child's room.

Figure 11:
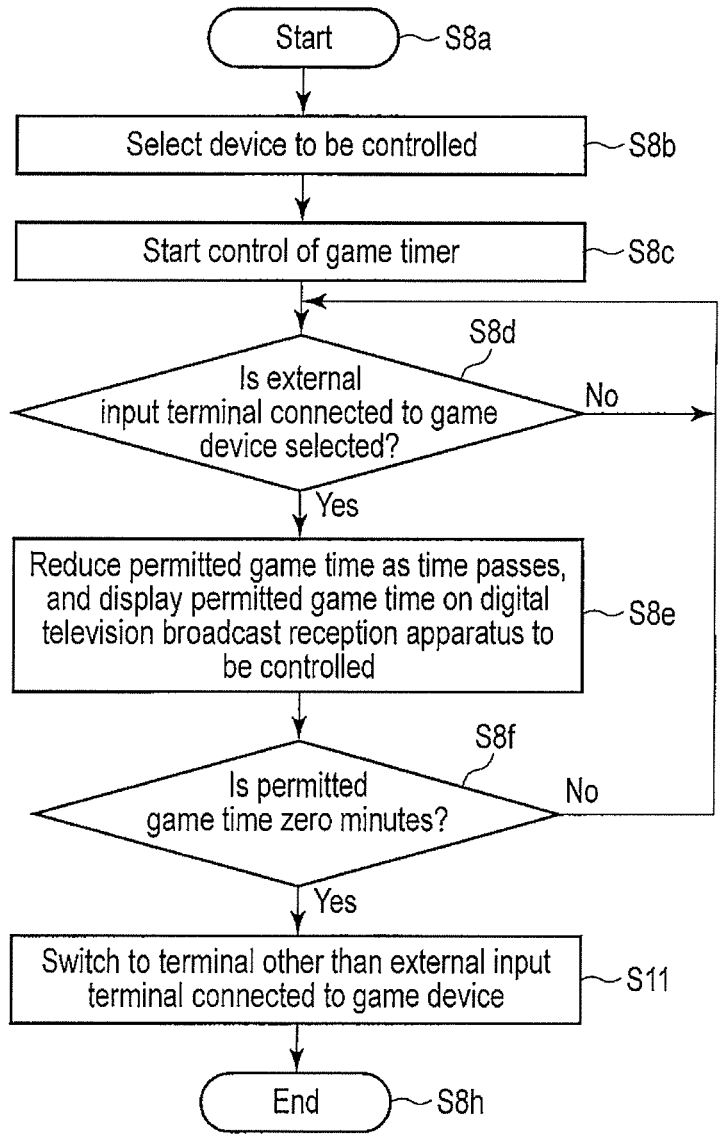
FIG. 11 is flowchart illustrating and explaining a modification of processing operation performed by the digital television broadcast reception apparatus according to the embodiment.

FIG. 11 illustrates a flowchart summarizing a modification of processing operation for controlling the game timer. In FIG. 11, the same steps as those of FIG. 8 are denoted with the same reference numerals, and only different steps will be explained here.

That is, when the permitted game time is determined to be 0 minutes in step S8f (YES), the game timer module 34d controls the game timer module 34d to cause the controlled digital television broadcast reception apparatus 18 to select an external input terminal other than the external input terminal 18a connected to the game device 22 in step S11 instead of performing the processing of step S8g.

That is, when the permitted game time becomes 0 minutes, the game is controlled to be forcibly terminated. In this case, the game may be stopped without fail by prohibiting the controlled digital television broadcast reception apparatus 18 to select the external input terminal 18a connected to the game device 22.

It should be noted that this is not limited to the game, and the digital television broadcast reception apparatus 15 serving as the host device may control the other digital television broadcast reception apparatus 18 to forcibly select a specified external input terminal, and may control the other digital television broadcast reception apparatus 18 not to select a particular external input terminal.

In this case, the above game timer control process functions for the game device 22 externally connected to the digital television broadcast reception apparatus 18, i.e., a game stop message is given or switching to another external input terminal is done when the time the game device 22 is used totally becomes 60 minutes whoever plays the game.

However, the game timer control may be performed for each user. For example, a user A inputs his/her identification number, and accesses the digital television broadcast reception apparatus 18. Then, when the user A plays the game for twenty minutes with the game device 22 connected to the external input terminal 18a, the permitted game time of the user A is managed as 40 minutes that is obtained by subtracting 20 minutes from the initial value of 60 minutes.

On the other hand, a user B inputs his/her identification number, and accesses the digital television broadcast reception apparatus 18. Then, when the user B plays the game for 40 minutes with the game device 22 connected to the external input terminal 18a, the permitted game time of the user B is managed as 20 minutes that is obtained by subtracting 40 minutes from the initial value of 60 minutes.

In this case, the permitted game time of each of the users A, B is saved in the server 16 on the home network 11 in such a manner that the permitted game time corresponds to the identification number of each of the users A, B.

On the other hand, the game timer control process can be performed for each user with respect to the entire home network 11. In other words, the user A inputs his/her identification number, accesses the digital television broadcast reception apparatus 18, plays the game for 10 minutes with the game device 22 connected to the external input terminal 18a, and further, inputs his/her identification number, accesses the digital television broadcast reception apparatus 19, and plays the game for 15 minutes with the game device 23 connected to the external input terminal 19a. In such case, the permitted game time of the user A is managed as 35 minutes that is obtained by subtracting 10+15=25 minutes from the initial value of 60 minutes.

In other words, the user B inputs his/her identification number, accesses the digital television broadcast reception apparatus 18, plays the game for 20 minutes with the game device 22 connected to the external input terminal 18a, and further, inputs his/her identification number, accesses the digital television broadcast reception apparatus 19, and plays the game for 20 minutes with the game device 23 connected to the external input terminal 19a. In such case, the permitted game time of the user B is managed as 20 minutes that is obtained by subtracting 20+20=40 minutes from the initial value of 60 minutes.

That is, even when the game is played with any one of the game devices 22, 23 constituting the home network 11, the game timer control process functions for each user with respect to the total game time of the user. In this case, the permitted game time of each of the users A, B is also saved in the server 16 on the home network 11 in such a manner that the permitted game time corresponds to the identification number of each of the users A, B.

In this case, it is to be understood that, for example, the game device constituting the home network 11 also includes a portable terminal (for example, smart phone) that can communicate with a device on the home network 11 with a wireless LAN communication function such as wireless fidelity (Wi-Fi).

Figure 12:
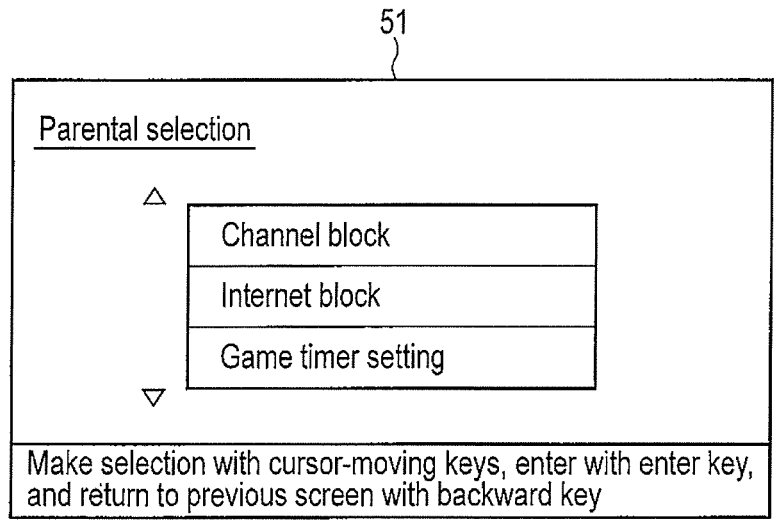
FIG. 12 is a figure illustrating and explaining an example of a parental selection-screen displayed by the digital television broadcast reception apparatus according to the embodiment.

Alternatively, when the game timer control process is performed, the initial value of the permitted game time can be changed according to users. This change is made as follows. The user manipulates the menu key 36k of the remote controller 36 to follow a plurality of menu screens arranged in a hierarchical structure, and thereby a parental selection-screen 51 as shown in FIG. 12 is displayed on the video display module 32.

The parental selection-screen 51 is scrolled when the user manipulates the cursor upward or downward moving keys 36f, 36g of the remote controller 36, so that all the configurable items are displayed. In the example as shown in FIG. 12, the following items are shown: channel block for limiting reception channels, Internet block for limiting connection to the Internet, and game timer setting for setting the permitted game time.

Figure 13:
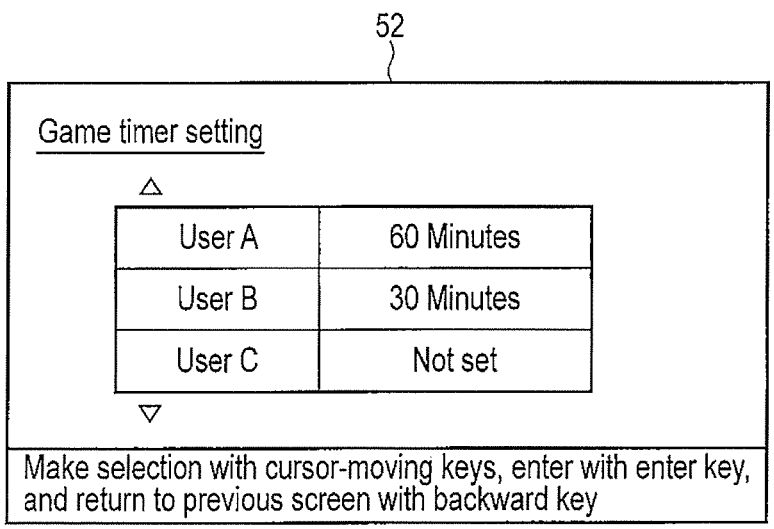
FIG. 13 is a figure illustrating and explaining an example of a game timer setting screen displayed by the digital television broadcast reception apparatus according to the embodiment.

In this case, when the user manipulates the cursor upward or downward moving keys 36f, 36g of the user remote controller 36 to select the item of the game timer setting and manipulates the enter key 36j, a game timer setting screen 52 as shown in FIG. 13 is displayed on the video display module 32.

The game timer setting screen 52 is scrolled when the user manipulates the cursor upward or downward moving keys 36f, 36g of the remote controller 36, so that all the configurable users are displayed. In the example as shown in FIG. 13, the initial values of the permitted game times of the three users A, B, C are respectively displayed.

Then, in the game timer setting screen 52, the user manipulates the cursor upward or downward moving keys 36f, 36g of the user remote controller 36 to select the user A. In this state, when the user further manipulates the cursor left or right moving keys 36h, 36i of the remote controller 36, the initial value of the permitted game time for the user A changes stepwise to unlimited time, 120 minutes, 60 minutes, and 30 minutes. Accordingly, the initial value of the permitted game time for the user can be set by manipulating the enter key 36j when a desired initial value is displayed.

Alternatively, the permitted game time may be set as a number of hours (minutes) per day, or may be set as a number of hours (minutes) per week. As a result, more specifically, a parent can set a certain reference period such as a day or a week for a child, and do management in such a manner that the child is allowed to play the game for a number of hours (minutes) within the reference period.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A first displaying device including a device control apparatus which communicates with a second displaying device through a network by using a command defined in a communication protocol for the network, the first displaying device comprising:
    an acquisition module configured to obtain, from the second displaying device, information related to a first terminal, wherein the second displaying device has the first terminal configured to connect to a game device, a second terminal configured to connect to the network and other terminals, and the first terminal is not connected to the network;
    a display controller configured to display the information, at the first display device, obtained by the acquisition module, the information indicating whether the first terminal is being connected to the game device or not; and
    a game time controller configured to measure a time for which the first terminal is being connected to the game device, based on the information obtained by the acquisition module, and to prompt the second displaying device to exclude the connection between the first terminal and the game device, when the measured time reaches a predetermined time set in advance.

2. The first displaying device of claim 1, wherein the acquisition module is further configured to obtain, from the second displaying device, at least one of information indicating terminal names of the second displaying device, and information indicating a device connected to at least one of the terminals of the second displaying device.

3. The first displaying device of claim 1, wherein the game time controller is configured to display a message prompting the second displaying device to stop a game when the measured time attains a predetermined time set in advance.

4. The first displaying device of claim 3, wherein the game time controller is configured to be able to change a length of the predetermined time for each user.

5. The first displaying device of claim 1, wherein the game time controller is configured to prohibit the second displaying device from selecting the external input terminal connected to the game device.

6. The first displaying device of claim 1, wherein the display controller is configured to display a time for which the second displaying device connected to the network selects at least one of the external input terminals of the second displaying device, based on the information about the terminals of the second displaying device acquired by the acquisition module.

7. The first displaying device of claim 1, wherein the display controller is configured to display whether the second displaying device connected to the network is selecting at least one of the terminals of the second displaying device, based on information indicating whether the second displaying device is selecting the at least one of the terminals of the second displaying device.

8. A device control method, wherein a first displaying device includes a device control apparatus which communicates with a second displaying device through a network by using a command defined in a communication protocol for the network, the device control method comprising:
    obtaining, from the second displaying device, information related to a first terminal, wherein the second displaying device has the first terminal configured to connect to a game device, a second terminal configured to connect to the network and other terminals, and the first terminal is not connected to the network;
    displaying the information obtained from the second displaying device at the first displaying device, the information indicating whether the first terminal is being connected to the game device or not; and
    measuring a time for which the first terminal is being connected to the game device, based on the information obtained from the second displaying device, and to prompt the second displaying device to exclude the connection between the first terminal and the game device, when the measured time reaches a predetermined time set in advance.

* * * * *